US010148188B2

(12) United States Patent
Koo et al.

(10) Patent No.: US 10,148,188 B2
(45) Date of Patent: Dec. 4, 2018

(54) CLAMP VOLTAGE DETECTION AND OVER-VOLTAGE PROTECTION FOR POWER SUPPLY TOPOLOGIES

(71) Applicant: FAIRCHILD SEMICONDUCTOR CORPORATION, Sunnyvale, CA (US)

(72) Inventors: Gwanbon Koo, Sunnyvale, CA (US); Dibyendu Rana, Milpitas, CA (US)

(73) Assignee: FAIRCHILD SEMICONDUCTOR CORPORATION, Phoenix, AZ (US)

( * ) Notice: Subject to any disclaimer, the term of this patent is extended or adjusted under 35 U.S.C. 154(b) by 3 days.

(21) Appl. No.: 15/676,445

(22) Filed: Aug. 14, 2017

(65) Prior Publication Data

US 2018/0069480 A1    Mar. 8, 2018

Related U.S. Application Data

(60) Provisional application No. 62/383,770, filed on Sep. 6, 2016.

(51) Int. Cl.
*H02M 3/335* (2006.01)
*H02M 1/08* (2006.01)
(Continued)

(52) U.S. Cl.
CPC ......... *H02M 3/33523* (2013.01); *H02M 1/08* (2013.01); *H02M 1/32* (2013.01);
(Continued)

(58) Field of Classification Search
CPC ............ H02M 3/22; H02M 3/24; H02M 3/28; H02M 3/325; H02M 3/335; H02M 3/3353;
(Continued)

(56) References Cited

U.S. PATENT DOCUMENTS 6,496,392 B2 * 12/2002 Odell .................. H02M 1/34
363/56.11
7,671,578 B2 * 3/2010 Li .................... G01R 15/183
324/72
(Continued)

OTHER PUBLICATIONS

FSL206MR, "Green Mode Fairchild Power Switch FPS", Fairchild Semiconductor Corporation, 2012, pp. 1-14.*
(Continued)

*Primary Examiner* — Timothy J Dole
*Assistant Examiner* — Carlos Rivera-Perez
(74) *Attorney, Agent, or Firm* — Polansky & Associates, P.L.L.C.; Paul J. Polansky (57) ABSTRACT

An active clamp flyback controller includes first and second input terminals, a clamp voltage detection circuit, and an overvoltage protection circuit. The first input terminal is adapted to be coupled to a terminal of a clamp capacitor. The second input terminal receives a feedback signal proportional to a voltage across an auxiliary winding of a flyback transformer. The clamp voltage detection circuit is coupled to the first and second input terminals, and detects a clamp voltage as a difference between a voltage at the first input terminal and an input voltage, the clamp voltage detection circuit calculating the input voltage using a signal from the second input terminal. The overvoltage protection circuit is coupled to the clamp voltage detection circuit for comparing the clamp voltage to a threshold and triggering a protection operation if the clamp voltage is greater than the threshold.

32 Claims, 5 Drawing Sheets

(51) Int. Cl.
*H02M 1/32* (2007.01)
*H02M 1/36* (2007.01)
*H02M 1/00* (2006.01)
*H02M 1/34* (2007.01)

(52) U.S. Cl.
CPC ...... *H02M 1/36* (2013.01); *H02M 2001/0006* (2013.01); *H02M 2001/0058* (2013.01); *H02M 2001/342* (2013.01)

(58) Field of Classification Search
CPC ......... H02M 3/33507; H02M 3/33515; H02M 3/33523; H02M 3/33538; H02M 3/33546; H02M 3/33553; H02M 3/33569; H02M 1/08; H02M 1/083; H02M 1/32; H02M 1/34; H02M 1/36; H02M 1/4208; H02M 1/4258; H02M 1/44; H02M 2001/0009; H02M 2001/0012; H02M 2001/0016; H02M 2001/0022; H02M 2001/0025; H02M 2001/0032; H02M 2001/322; H02M 2001/325; H02M 2001/342; H02M 2001/344; H02M 2001/346; H02M 2001/348; H02M 7/06; H02M 7/02; H02M 7/04; H02M 7/062; H02M 7/12; H02M 7/125; H02M 7/21; H02M 7/217; H02M 7/2176; H02M 2001/0006; H02M 2001/0058

USPC .................. 363/16–21.18, 37, 40–43, 49, 50, 363/55–56.12, 89, 95–99, 109, 131–134, 363/148; 323/205–211, 222–226, 235, 323/238, 271–278, 282–287, 299–303, 323/351, 901; 361/18, 88–91.1, 92
See application file for complete search history.

(56) References Cited

U.S. PATENT DOCUMENTS

| | | | | |
|---|---|---|---|---|
| 2008/0278973 | A1* | 11/2008 | Lin | H02M 3/33523 363/21.08 |
| 2010/0309694 | A1* | 12/2010 | Huang | H02M 1/126 363/49 |
| 2011/0305048 | A1* | 12/2011 | Yang | H02M 1/083 363/21.03 |

OTHER PUBLICATIONS

Watson, R. et al.,"Utilization of an Active-Clamp Circuit to Achieve Soft Switching in Flyback Converters," 25th Annual IEEE Power Electronics Specialists Conference, Jun. 20-25, 1994, Taipei, Taiwan, ISBN 0-7803-1859-5, Excerpt pp. 909-916, Figs. 1-9, 8 pages.
Koo, Gwan-bon et al.,"A New Zero Voltage Switching Active Clamp Flyback Converter," 35th Annual IEEE Power Electronics Specialists Conference, Jun. 20-25, 1994, Aachen, Germany, ISBN: 0-7803-8399-0, Excerpt pp. 508-510, Figs. 1-3, 3 pages.

* cited by examiner

CLAMP VOLTAGE DETECTION AND OVER-VOLTAGE PROTECTION FOR POWER SUPPLY TOPOLOGIES

BACKGROUND

The present disclosure relates to power converters and more particularly to power converters using active clamp flyback topologies.

Flyback converters are often used in alternating current to direct current (AC/DC) conversion. In some flyback architectures, an active clamp capacitor in series with a synchronously driven high side transistor is connected in parallel to the primary winding of the flyback transformer to smooth the output of the converter. The resulting converter is known as an active clamp flyback (ACF) converter.

When the ACF converter operates in steady state, it maintains the clamp voltage across the clamp capacitor ($V_{CLAMP}$) at approximately a certain value but with ripple around this value due to charging and discharging caused by leakage inductance current. If a fault happens that prevents the high side transistor from switching, the ACF converter continues to operate like a conventional flyback converter. However the MOSFET has a parasitic body diode that results from connecting the body to the source terminal. This body diode causes $V_{CLAMP}$ to increase since there is no discharge path. This buildup in voltage across the clamp capacitor will eventually cause the ACF converter to be damaged or otherwise to fail.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the circuits described herein can be practiced without one or more of the specific details. In other instances, well-known details are not shown or described to avoid obscuring aspects of the invention.

Figure 1:
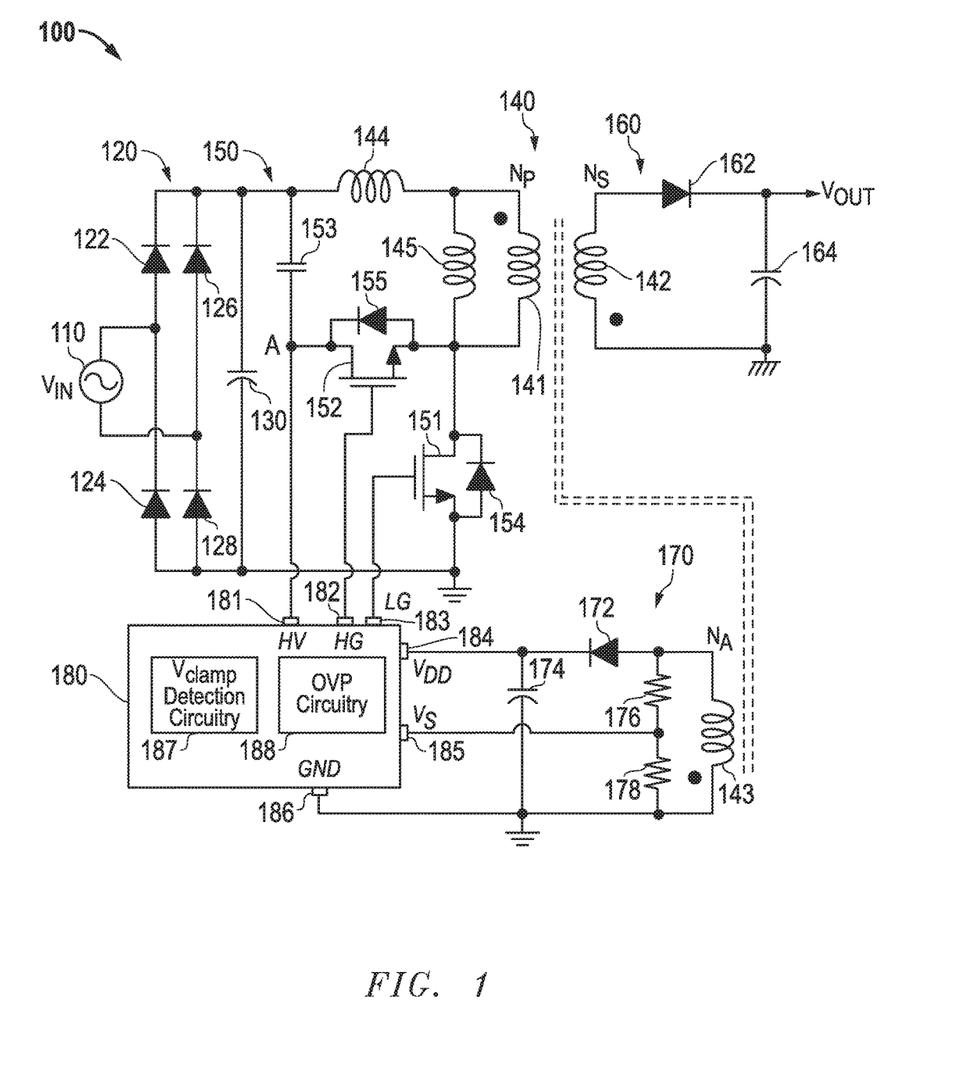
FIG. 1 illustrates in partial block diagram and partial schematic form a power supply system according to various embodiments.

FIG. 1 illustrates in partial block diagram and partial schematic form a power supply system 100 according to various embodiments. Power supply system 100 is an offline, AC/DC converter having an ACF topology. Power supply system 100 includes generally an AC voltage source 110, a bridge rectifier 120, a bulk capacitor 130, a flyback transformer 140, a primary side circuit 150 ((It's not indicated in FIG. 1.)), a secondary side circuit 160, a bias winding circuit 170, and an ACF controller 180.

AC voltage source 110 has first and second terminals and provides a time-varying full-wave AC voltage. For example, AC voltage source 110 could be a 110 $V_{RMS}$, 60 hertz (Hz) AC mains or a 220 $V_{RMS}$, 50 Hz AC mains.

Bridge rectifier 120 includes diodes 122, 124, 126, and 128. Diode 122 has an anode connected to the first terminal of AC voltage source 110, and a cathode. Diode 124 has an anode connected to primary ground, and a cathode connected to the anode of diode 122. Diode 126 has an anode connected to the second terminal of AC voltage source 110, and a cathode connected to the cathode of diode 122. Diode 128 has an anode connected to primary ground, and a cathode connected to the anode of diode 126.

Bulk capacitor 130 has a first terminal connected to the cathodes of diodes 122 and 126, and a second terminal connected to primary ground.

Flyback transformer 140 is a magnetic core transformer including a primary winding 141, a secondary winding 142, and an auxiliary winding 143. Also shown in FIG. 1 are a leakage inductance 144 and a magnetizing inductance 145. Primary winding 141 has a first end coupled to the cathodes of diodes 122 and 126 through leakage inductance 144, a second end coupled to the first end through magnetizing inductance 145, and has a number of turns labeled "$N_P$". Secondary winding 142 has a first end, and a second end connected to secondary ground. Auxiliary winding 143 has a first end, and a second end connected to primary ground.

Primary side circuit 150 includes a low side switch 151, a high side switch 152, and a clamp capacitor 153. Low side switch 151 is implemented as an N-channel metal-oxide-semiconductor field effect transistor (MOSFET) having a drain connected to the second end of primary winding 141, a gate, and a source connected to primary ground. High side switch 152 is implemented as an N-channel MOSFET having a drain connected to a node labeled "A", a gate, and a source connected to the drain of low side switch 151 and to the second end of primary winding 141. Clamp capacitor 153 has a first terminal connected to the cathodes of diodes 122 and 126, and a second terminal connected to the drain of high side switch 152. In some embodiments, a Zener diode (not shown) may be connected in parallel to clamp capacitor 153, whose anode is connected to the cathodes of diodes 122 and 126 and whose cathode is connected to Node "A." Associated with low side switch 151 and high side switch 152 are respective parasitic diodes 154 and 155. These parasitic diodes are known as body diodes and represent the PN junctions formed by the connection of the respective MOSFET transistor's body to its source. Each of the parasitic diodes has an anode connected to the source of the respective MOSFET, and a cathode connected to the drain of the respective MOSFET.

Secondary side circuit 160 includes a diode 162 and a capacitor 164. Diode 162 has an anode connected to the first end of secondary winding 142, and a cathode for providing an output voltage labeled "$V_{OUT}$" to a load (not shown in FIG. 1). Capacitor 164 has a first terminal connected to the cathode of diode 162, and a second terminal connected to secondary ground.

Bias winding circuit 170 includes a diode 172, a capacitor 174, a resistor 176, and a resistor 178. Diode 172 has an anode connected to the first end of auxiliary winding 143, and a cathode. Capacitor 174 has a first terminal connected to the cathode of diode 172, and a second terminal connected to primary ground. Resistor 176 has a first terminal connected to the first end of auxiliary winding 143, and a second terminal. Resistor 178 has a first terminal connected to the second terminal of resistor 176, and a second terminal connected to primary ground.

ACF controller 180 has a high voltage terminal 181 labeled "HV" connected to the drain of high side switch 152 and to the second terminal of clamp capacitor 153, a high side switch gate terminal 182 labeled "HG" connected to the gate of high side switch 152, a low side switch gate terminal 183 labeled "LG" connected to the gate of low side switch 151, a power supply terminal 184 labeled "$V_{DD}$" connected to the cathode of diode 172 and to the first terminal of capacitor 174, a sense voltage terminal 185 labeled "$V_S$" connected to the second terminal of resistor 176 and to the first terminal of resistor 178, and a ground terminal 186 labeled "GND" connected to primary ground.

ACF controller 180 includes two circuits of interest, a $V_{CLAMP}$ detection circuit 187, and an over-voltage protection (OVP) circuit 188. ACF controller 180 also includes various other control and protection terminals and circuits. Since these are conventional, they are not shown nor described in detail herein.

In operation, power supply system 100 receives a time varying input voltage from AC voltage source 110 and generates output voltage $V_{OUT}$ to supply a current based on the power demand of a load receiving output voltage $V_{OUT}$. While power supply system 100 uses an AC/DC ACF topology, it should be understood that the techniques disclosed herein may be implemented in DC/DC active clamp topologies, AC/DC active clamp forward topologies, DC/DC active clamp forward topologies, etc. The circuitry described herein with reference to power supply system 100 may reside, in whole or in part, within a single device such as, for example, an integrated circuit (IC), or alternatively, some or all of the elements in power supply system 100 may be discrete components, combinations of ICs and discrete components, etc. Power supply system 100 may be utilized to convert conventional wall power (e.g., 110 $V_{RMS}$ AC, 220 $V_{RMS}$ AC, etc.) to a DC voltage for a mobile communication and/or computing device.

ACF controller 180 controls the duty cycle of switch 151 using pulse width modulation (PWM) to regulate $V_{OUT}$ and adjust the duty cycle of switch 151 using conventional voltage and/or current mode control. In addition, ACF controller 180 activates high side switch 152 in a generally complementary fashion to activating low side switch 151. ACF controller 180 thereby operates power supply system 100 in a repeating sequence of switching states, as is well understood.

ACF controller 180 uses the active clamp formed by high side switch 152 and clamp capacitor 153 to clamp the transistor turn-off voltage spike and to recycle the transformer leakage energy. This operation makes zero-voltage-switching (ZVS) possible for both low side switch 151 and high side switch 152, while requiring a few additional power stage components and slightly increasing the complexity of ACF controller 180 compared to traditional flyback control.

Unlike conventional ACF controllers, however, ACF controller 180 connects the HV pin to node A both to measure $V_{CLAMP}$ and to allow the controllable discharge of $V_{CLAMP}$. Thus, ACF controller 180 prevents the uncontrolled buildup of $V_{CLAMP}$ when high side switching fails. As will be described further below, ACF controller 180 also does not measure $V_{CLAMP}$ directly, avoiding the need for an additional integrated circuit high-voltage terminal. Instead, it measures $V_{CLAMP}$ indirectly by measuring the voltage on node A and using the current through $V_S$ terminal 185 to calculate the voltage on the first terminal of clamp capacitor 153. ACF controller 180 also discharges $V_{CLAMP}$ to a safe level using a junction field effect transistor (JFET).

Moreover, ACF controller 180 uses an existing IC terminal—the HV terminal—to measure the voltage on the second terminal of clamp capacitor 153 and to perform the discharge operation. ACF controller 180 also connects the HV pin to an internal bypass circuit during startup to provide power to ACF controller 180 before auxiliary winding 143 and bias winding circuit 170 are able to generate a sufficiently large value for $V_{DD}$.

ACF controller 180 determines $V_{CLAMP}$ as follows. First, ACF controller 180 determines an initial peak value of input voltage $V_{IN}(t)$, referred to herein as $V_{IN}^*$, at startup before switching using switches 151 and 152. At this point, clamp capacitor 153 is assumed to be fully discharged, and therefore $V_{IN}^*$ represents the isolated, initial peak value of $V_{IN}(t)$.

Second, after startup, ACF controller 180 starts switching switches 151 and 152, measures the value of the current into the $V_S$ pin, labeled "$I_{VS}(t)$", and also measures the peak value $I_{VS}^*$. The current into $V_S$ terminal 185 is proportional to $V_{IN}(t)$, and the value of $I_{VS}^*$ is also proportional to $V_{IN}^*$, as shown by the following equation, in which $N_A$ is the number of turns of auxiliary winding 143, $N_P$ is the number of turns of primary winding 141, and $R_1$ is the resistance of resistor 176:

$$I_{VS^*} = \frac{V_{TH} - \frac{N_A}{N_P}V_{IN^*}}{R_1} \quad [1]$$

Assuming $V_{TH}$ is approximately zero volts, $I_{VS}^*$ is given by:

$$I_{VS^*} = \frac{-\frac{N_A}{N_P}V_{IN^*}}{R_1} \quad [2]$$

Thus the peak current $I_{VS}^*$ through $V_S$ pin 185 is proportional to the peak input voltage $V_{IN}^*$. ACF controller 180 may include memory, not shown in FIG. 1, to store the values of $V_{IN}^*$ and $I_{VS}^*$.

Third, during normal operation, ACF controller 180 measures and stores the instantaneous value of $I_{VS}(t)$.

Fourth, ACF controller 180 calculates $V_{IN}(t)$ using the measured values of $I_{VS}(t)$, $V_{IN}^*$, and $I_{VS}^*$. $V_{IN}(t)$ is given by the following equation:

$$V_{IN}(t) = I_{VS}(t) \cdot V/I_{VS}^* \quad [3]$$

Furthermore ACF controller 180 by measuring the voltage of node A, which is equal to $V_{IN}(t)+V_{CLAMP}$, and subtracting $V_{IN}(t)$ from the quantity $V_{IN}(t)+V_{CLAMP}$:

$$V_{CLAMP} = V_A - V_{IN}(t) = V_A - I_{VS}(t) \cdot V_{IN}^*/I_{VS}^* \quad [4]$$

In this manner, ACF controller 180 uses OVP circuit 188 to detect when the value of $V_{CLAMP}$ is too high, and to selectively discharge $V_{CLAMP}$ to a value within the desired range. OVP circuit 188 does this function hysteretically. In one example, in a 120 $V_{RMS}$ AC mains system, OVP circuit 188 detects when the calculated value of $V_{CLAMP}$ rises above 180 V, and then discharges $V_{CLAMP}$ until the voltage falls below 120 V.

Figure 2:
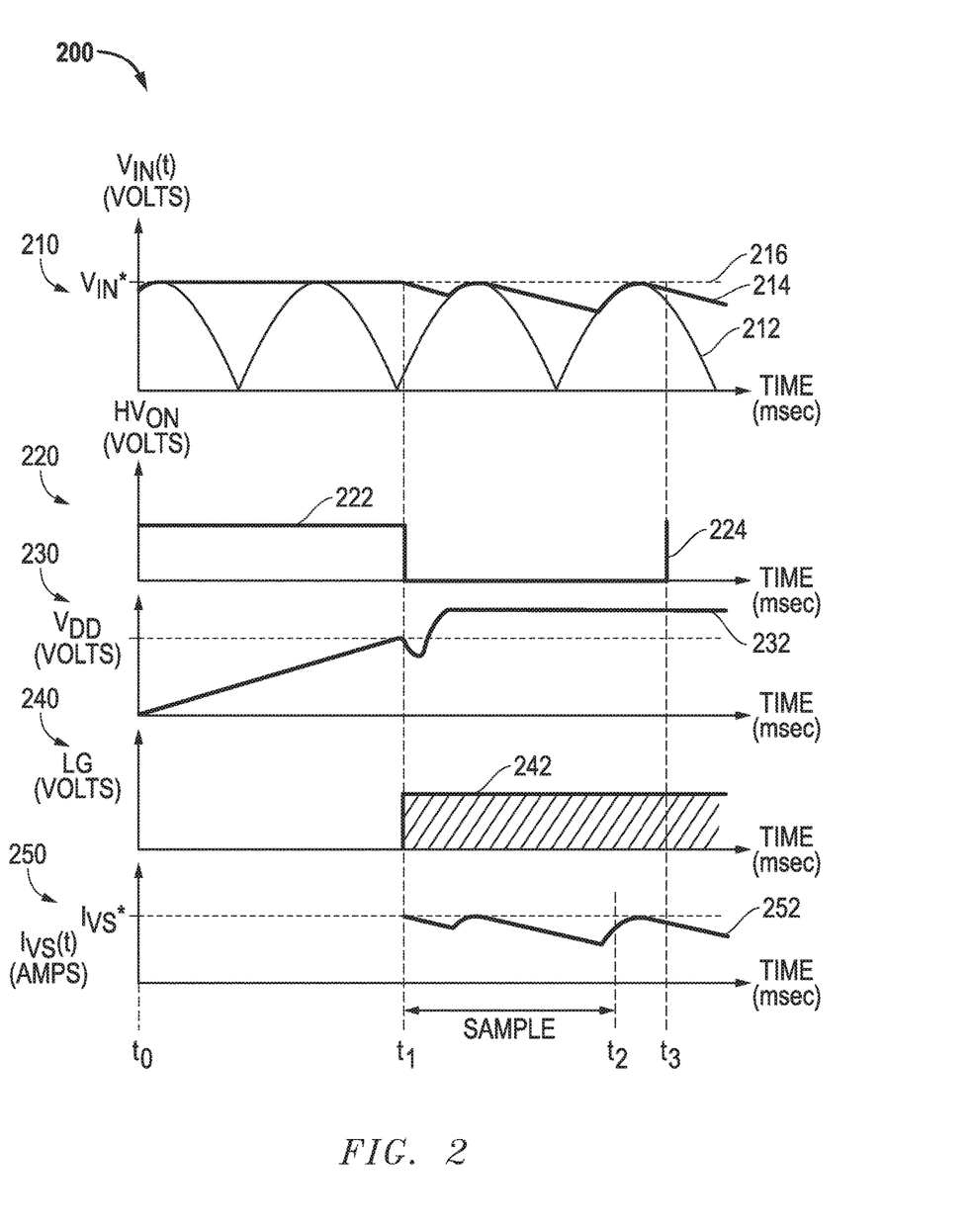
FIG. 2 illustrates a set of timing diagrams showing several signals of the power supply system of FIG. 1.

FIG. 2 illustrates a set of timing diagrams showing several signals of power supply system 100 of FIG. 1. In timing diagram set 200, the horizontal axis represents time in milliseconds (msec), and the vertical axis represents the value of several signals in volts or amperes, as the case may be. Timing diagram set 200 shows five signals of interest: $V_{IN}(t)$, $HV_{ON}$ $V_{DD}$, LG, and $I_{VS}(t)$ in corresponding timing diagrams 210, 220, 230, 240, and 250. Timing diagram set 200 also shows four time of interest, labeled "$t_0$", "$t_1$", "$t_2$", and "$t_3$".

Timing diagram 210 includes a waveform 212 of $V_{IN}(t)$ shown as a rectified sine wave, i.e. a haversine wave, formed from the operation of bridge rectifier 120 of FIG. 1. This haversine wave can be generated, for example, as a full wave rectified AC mains voltage. A waveform 214 represents a smoothed haversine wave through the operation of bulk capacitor 130. Waveform 214 reaches a peak value labeled "$V_{IN}^*$" between $t_0$ and $t_1$. time $t_1$, ACF controller 180 starts switching current through primary winding 141 of flyback transformer 140 to deliver current to the load. Waveform 214 starts to follow more the contours of waveform 212 after time $t_1$ due to the buildup of magnetic flux in flyback transformer 140.

Timing diagram 220 includes a waveform of a control signal labeled "$HV_{ON}$" having an active high puke 222 for more than one full cycle of $V_{IN}(t)$ between $t_0$ and $t_1$ until $V_{DD}$ reaches its threshold to activate the ACF controller 180. After $t_1$, however, ACF controller 180 only activates the $HV_{ON}$ signal for very short time periods. For example, ACF transformer may activate $HV_{ON}$ for 3 microseconds (μs) for every 300 μs.

Timing diagram 230 includes a waveform 232 of operating power supply voltage $V_{DD}$. During startup and before ACF controller 180 starts switching flyback transformer 140, a bypass circuit internal to ACF controller 180 uses the primary line voltage to power the internal circuits. Between times $t_0$ and $t_1$, ACF controller 180 uses the smoothed, rectified input voltage to ramp the voltage on the external storage capacitor in a roughly linear mode. Once $V_{DD}$ reaches an internal lockout threshold, labeled "$V_{UVLO}$", however, the bypass circuit disconnects the smoothed, rectified input voltage from the storage capacitor. Thereafter, the voltage initially drops as the current demand is greater than the ability of the auxiliary winding to provide current. Over a relatively short amount of time, the voltage on the capacitor ramps back toward the voltage generated by auxiliary winding 143.

Timing diagram 240 includes a waveform 242 showing the value of the LG signal applied to the gate of switch 151. As is shown by waveform 242, it starts in an inactive state between times $t_0$ and $t_1$, keeping switch 151 non-conductive. After time $t_1$, waveform 242 switches at a relatively high rate compared to the frequency of waveform 212, and thus it is shown as a shaded area.

Timing diagram 250 includes a waveform 252 showing the value of the $I_{VS}(t)$ signal conducted through $V_S$ terminal 185. Waveform 252 starts switching at time $t_1$, and reaches a peak value labeled "$I_{VS}^*$" during the period between time $t_1$ and time $t_2$. Because it is the next subsequent cycle, this technique assumes that the line voltage has not changed significantly.

The inventors discovered that the instantaneous value of the line voltage, i.e. the voltage across bulk capacitor 130, can be determined without measuring it directly. The voltage across the auxiliary winding 143, and thus signal $I_{VS}$, is proportional to the line voltage while low side switch 151 turns on. If the value of the peak voltage $V_{IN}^*$ is multiplied by the ratio of the value of the instantaneous current $I_{VS}(t)$ to the peak current $I_{VS}^*$, then the value of the instantaneous voltage $V_{IN}(t)$ at the first terminal of clamp capacitor 153 can be calculated without directly being measured. The instantaneous value of $V_{CLAMP}$ can be calculated as the difference between the instantaneous voltages on the first and second terminals of clamp capacitor 153. Thus ACF controller 180 does not need an additional IC high-voltage terminal to measure $V_{IN}(t)$ directly, reducing the cost of ACF controller 180.

Once $V_{CLAMP}$ has been determined, then ACF controller 180 can use it to selectively implement an overvoltage protection function to prevent voltages that are so high that they might otherwise cause damage to the components of power supply system 100. For example, ACF controller 180 can perform the overvoltage protection function by selectively discharging the voltage on the second terminal of clamp capacitor 153. An overvoltage protection technique that takes into account green mode and other low power modes is described further below.

Figure 3:
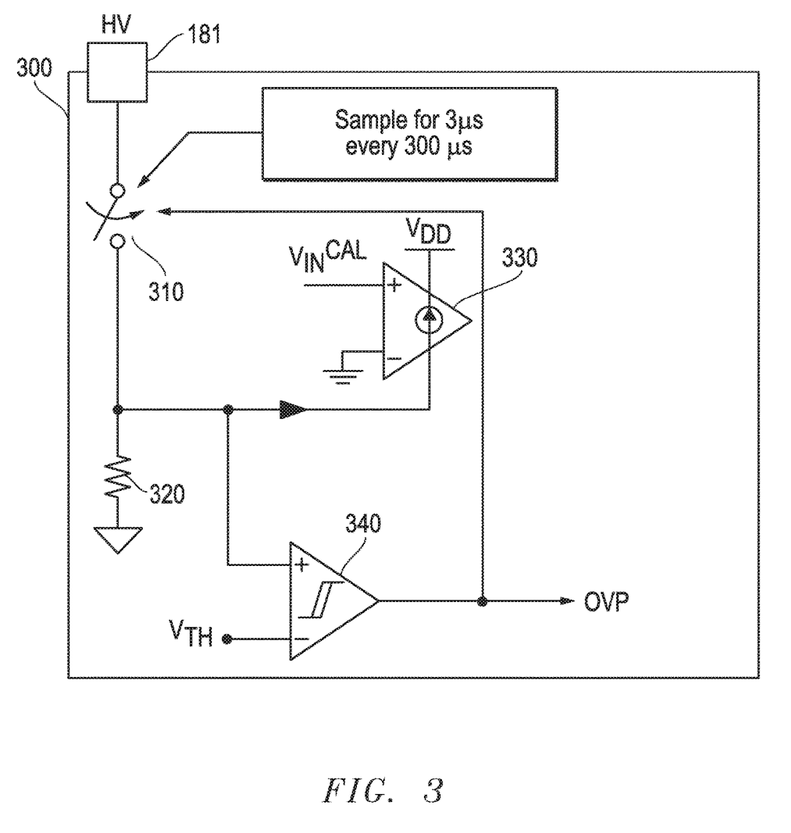
FIG. 3 illustrates in partial block diagram and partial schematic form a simplified circuit of an ACF controller that may be used to implement the $V_{CLAMP}$ detection circuit and the OVP circuit of FIG. 1.

FIG. 3 illustrates in partial block diagram and partial schematic form a simplified diagram of an ACF controller 300 that may be used to implement $V_{CLAMP}$ detection circuit 187 and OVP circuit 188 of FIG. 1. ACF controller 300 includes HV terminal 181, a switch 310, a resistor 320, a transconductance amplifier 330, and a comparator 340. Switch 310 has a first terminal connected to H V terminal 181, a second terminal, and a control terminal. Resistor 320 has a first terminal connected to the second terminal of switch 310, and a second terminal connected to ground. Transconductance amplifier 330 has a non-inverting input for receiving a voltage labeled "$V_{IN}^{CAL}$", an inverting input connected to primary ground, a positive current terminal connected to $V_{DD}$, and an output terminal connected to the first terminal of resistor 320. Comparator 340 has a non-inverting input connected to the first terminal of resistor 320, an inverting input for receiving a threshold voltage labeled "$V_{TH}$", and an output for providing an output signal labeled "OVP" shown in FIG. 3 as being connected to the control terminal of switch 310.

In operation, ACF controller 300 periodically closes switch 310 to sample the voltage on the HV pin. In one example, ACF controller 300 closes switch 310 once for 3 μs during a period of 300 μs. The voltage on the second terminal of clamp capacitor 153 that is connected to the HV pin is equal to $V_{IN}(t)+V_{CLAMP}$. $V_{IN}(t)$ can be measured directly, but would require the addition of an integrated circuit high-voltage terminal. However ACF controller 300 uses the indirectly measured signal $V_{IVS}$ to measure $V_{CLAMP}$ and to perform a protection operation when $V_{CLAMP}$ is too high.

The current flowing through switch 310 into the first terminal of resistor 320 is equal to $(V_{IN}(t)+V_{CLAMP})/R_S$, in which $R_S$ is the resistance of resistor 320. Transconductance amplifier 330 subtracts a current equal to $V_{IN}^{CAL}*g_m$ from this current, in which $g_m$ is the transconductance of transconductance amplifier 330. Note that since $V_{CLAMP}+V_{IN}(t)>V_{DD}$, the current flows from HV terminal 181 into $V_{DD}$ and reduces the current through resistor 320. The current flowing through resistor 320 is equal to $(V_{IN}(t)+V_{CLAMP})/R_S-V_{IN}^{CAL}*g_m$. If $g_m$, is set to be equal to $1/R_S$, then the current through resistor 320 is equal to $(V_{IN}(t)+V_{CLAMP}-V_{IN}^{CAL})/R_S$. If $V_{IN}(t) \approx V_{IN}^{CAL}$, then the voltage on the non-inverting input of comparator 340 is approximately equal to $V_{CLAMP}$. By proper selection of $g_m$, $R_S$, and $V_{TH}$, comparator 340 can activate the OVP signal when $V_{CLAMP}$ is above a certain undesirable voltage level.

In response to the activation of the OVP signal, switch 310 closes and starts to discharge clamp capacitor 153. Once the voltage across clamping bulk capacitor 130 falls to a sufficiently low voltage, ACF controller 300 deactivates the OVP signal. For example, ACF controller 300 can activate the OVP signal if $V_{CLAMP}$ is greater than 180 volts, and then subsequently de-active the OVP signal if $V_{CLAMP}$ falls below 120 volts.

This simple example shows how ACF controller 180 calculates $V_{IN}(t)$ without using an extra integrated circuit high-voltage terminal, and protects clamp capacitor 153 when $V_{CLAMP}$ is too high. In some embodiments, ACF controller 180 includes other advantageous mechanisms to support green mode and to reduce power consumption in a manner that will now be explained in greater detail.

Figure 4:
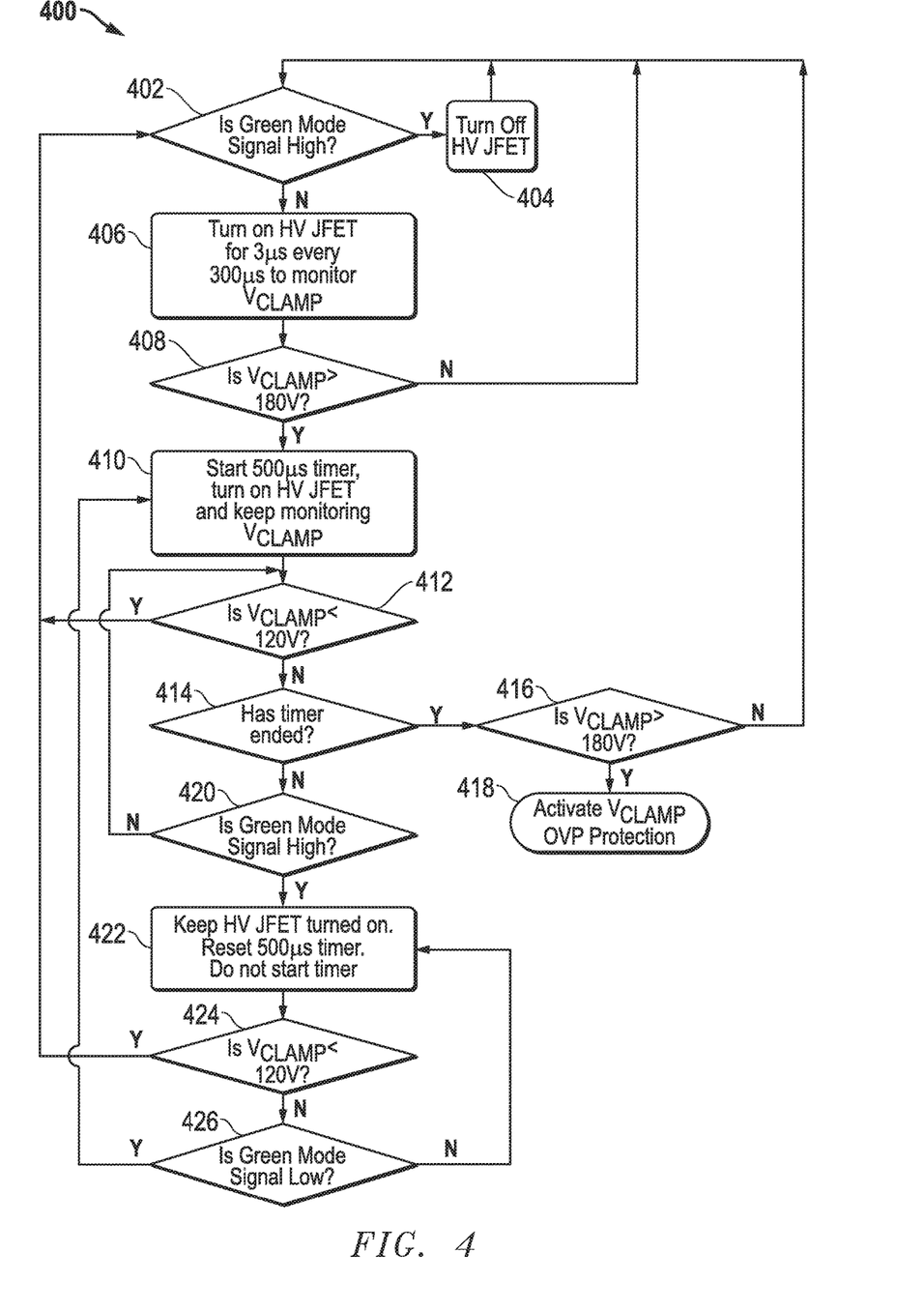
FIG. 4 illustrates a flow chart of the operation of the ACF controller of FIG. 1.

FIG. 4 illustrates a flow chart 400 of the operation of ACF controller 180 of FIG. 1. In a decision box 402, ACF controller 180 determines whether it is in a green mode by determining whether a green mode signal active, i.e. in this example whether the green mode signal is in a logic high state. If the green mode is active, ACF controller 180 turns off switch 310 in an action box 404 and flow returns to decision box 402, thus keeping switch 310 off while ACF controller 180 remains in green mode and reducing power consumption. Since there is no switching in green mode, there is no mechanism for $V_{CLAMP}$ to continue to increase, and thus ACF controller 180 saves power in green mode.

If ACF controller 180 is not in green mode, for example in a normal mode or in a burst mode, then at action box 406 ACF controller 180 activates switch 310 for a first time period, e.g. 3 µs, to monitor $V_{CLAMP}$. ACF controller 180 can perform this monitoring at regular intervals (e.g., 3 µs during a period of 300 µs) or at random intervals. In decision box 408, ACF controller 180 determines whether $V_{CLAMP}$ is greater than a first threshold, e.g. 180 V. If $V_{CLAMP}$ is greater than the first threshold, then at action box 410 ACF controller 180 keeps switch 310 closed while ACF controller 180 continues to monitor $V_{CLAMP}$. The timer counts for a second time period, e.g. 500 µs. During this time, clamp capacitor 153 discharges to $V_{DD}$ capacitor 174 and at the end of this time period, ACF controller 180 is able to measure $V_{CLAMP}$ as described above to determine whether the buildup in $V_{CLAMP}$ was a temporary occurrence or a more serious condition.

Flow proceeds to a set of three decision boxes 412, 414, and 420. In decision box 412, ACF controller 180 determines whether $V_{CLAMP}$ has discharged below a lower threshold, e.g. 120 V. If $V_{CLAMP}$ has fallen below the first threshold, then ACF controller 180 concludes that high side switch 152 is working properly and flow returns to decision box 402. If not, flow proceeds to decision box 414.

In decision box 414, ACF controller 180 determines whether the timer has expired. If so, then ACF controller 180 determines whether $V_{CLAMP}$ is still above the first threshold, e.g. 180 V. If so, then ACF controller 180 concludes that switch 152 or the connection between ACF controller 180 and switch 152 is faulty and performs on OVP operation in action box 418. In one example of the OVP operation, ACF controller 180 deactivates both switches 151 and 152 and otherwise shuts down power supply system 100 to protect the system and the load. If not, then ACF controller 180 concludes that switch 152 is probably working properly and returns the flow to decision box 402. For example, the buildup in $V_{CLAMP}$ may be the result of ACF controller 180 being in a burst mode, and the 500 µs interval would be long enough to lower $V_{CLAMP}$ below 180 V.

If the timer has not expired, then flow proceeds to decision box 420. In decision box 420, ACF controller 180 determines whether the green mode has become active. Since the activation of the green mode was previously checked in decision box 402, this condition indicates that the green mode was entered only after $V_{CLAMP}$ was detected above 180 V. If the green mode signal is not active, then ACF controller returns flow to decision box 412 and ACF controller 180 remains in this loop until either $V_{CLAMP}$ falls below 120 V, the timer has expired, or green mode is entered.

If green mode has been entered after the 500 µs timer was started but before it expired, then flow continues to action box 422. In action box 422, ACF controller 180 keeps switch 310 closed and resets, but does not restart, the 500 µs timer. Green mode automatically stops the switching of switches 151 and 152, and thus there is no longer a mechanism to increase the voltage on $V_{CLAMP}$ further. In decision box 424, ACF controller 180 determines whether $V_{CLAMP}$ has fallen below 120 V. If $V_{CLAMP}$ has fallen below 120 V, then flow returns to decision box 402, and ACF controller 180 continues to execute decision box 402 and action box 404 until the end of green mode as described above. If however $V_{CLAMP}$ is not below 120 V, then flow continues to decision box 426. In decision box 426, ACF controller 180 determines whether green mode is still active. If the green model signal is still high, i.e. green mode is still active, then flow returns to action box 422. If the green mode signal has gone low, indicating an end to green mode, then flow returns to action box 410 and the flow proceeds as described above.

In various embodiments, ACF controller 180 can implement the flow shown in flow chart 400 using hardware circuitry, firmware running on a microcontroller, or some combination of the two. ACF controller 180 implemented the operation in flow chart 400 to protect power supply system 100 from very high voltages related to the switching of switch 152 that can cause a runaway increase in $V_{CLAMP}$.

Figure 5:
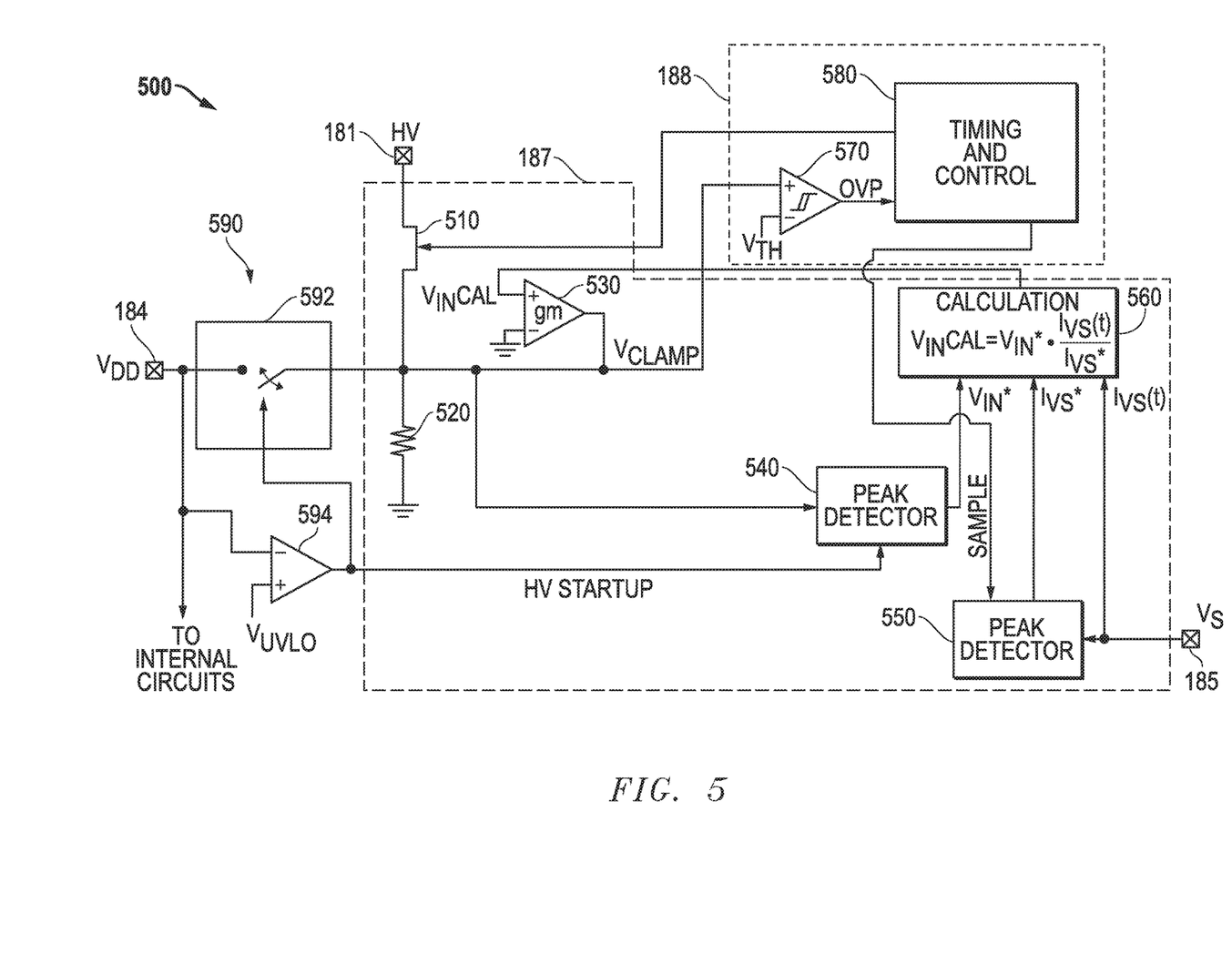
FIG. 5 illustrates in partial block diagram and partial schematic form an ACF controller that can be used to implement the ACF controllers of FIGS. 1 and 3.

FIG. 5 illustrates in partial block diagram and partial schematic form an ACF controller 500 that can be used to implement ACF controller 180 of FIG. 1 and ACF controller 300 of FIG. 3. ACF controller 500 can be implemented in a single integrated circuit but can also be implemented with discrete components. ACF controller 500 includes specific circuit implementations of $V_{CLAMP}$ detection circuit 187 and OVP circuit 188 connected to HV terminal 181, $V_{DD}$ terminal 184, and $V_S$ terminal 185, as well as a bypass circuit 590.

$V_{CLAMP}$ detection circuit 187 includes a junction field effect transistor (JFET) 510, a resistor 520, a transconductance amplifier 530, peak detectors 540 and 550, and a calculation circuit 560. J FET 510 has a drain connected to HV terminal 181, a gate, and a source. In other embodiments, JFET 510 could be replaced by another type of transistor such as a depletion MOSFET. Resistor 520 has a first terminal connected to the source of JFET 510, and a second terminal connected to ground. Transconductance amplifier 530 has a non-inverting input for receiving the $V_{IN}^{CAL}$ signal, an inverting input connected to primary ground, and an output connected to the first terminal of resistor 520. Peak detector 540 has an input connected to the first terminal of resistor 520, a control input for receiving a signal labeled "HV STARTUP", and an output for providing signal $V_{IN}*$. Peak detector 550 has an input connected to $V_S$ terminal 185, a control input for receiving a signal labeled "SAMPLE", and an output for providing the $I_{VS}*$ signal. Calculation block 560 has a first input connected to the output of peak detector 540, a second input connected to the output of peak detector 550, a third input connected to terminal 185 and an output connected to the non-inverting input of transconductance amplifier 530 for providing signal $V_{IN}{}^{CAL}$ thereto.

OVP circuit 188 includes a comparator 570 and a timing and control block 580. Comparator 570 has a non-inverting input connected to the first terminal of resistor 520 for receiving the $V_{CLAMP}$ signal, an inverting input for receiving the $V_{TH}$ reference voltage, and an output. Timing and control block 580 has an input connected to the output of comparator 570, a first output connected to the gate of JFET 510, and a second output connected to the input of peak detector 550 for providing the SAMPLE signal thereto.

Bypass circuit 590 includes a switch 592 and a comparator 594. Switch 592 has a first terminal connected to the first terminal of resistor 520, a second terminal connected to $V_{DD}$ terminal 184, and a control terminal. Comparator 594 has a non-inverting input for receiving a reference voltage labeled "$V_{UVLO}$", an inverting input connected to the second terminal of switch 592, and an output connected to the control input of peak detector 540 and to the control terminal of switch 592 for providing the RV STARTUP signal thereto.

ACF controller 500 is an embodiment of an ACF controller that implements the operations of the ACF controller described in FIGS. 1-4 above. Upon startup, timing and control block 580 activates the signal on the gate of JFET 510. Since $V_{DD}$ is low (assuming capacitor 174 is fully discharged), comparator 594 activates the HV STARTUP signal in a high state, closing switch 592 and allowing capacitor 174 to be charged through the HV pin. Peak detector 540 also captures the value of the HV pin at startup, $V_{IN}*$, since the voltage across clamp capacitor 153 is initially zero. As soon as the voltage on $V_{DD}$ terminal 184 exceeds $V_{UVLO}$, comparator 594 deactivates the HV STARTUP signal, opening switch 592. Thus ACF controller 500 has HV terminal 181 to provide internal power during startup, and also uses it further to measure $V_{CLAMP}+V_{IN}(t)$ after startup.

Timing and control block 580 activates the SAMPLE signal during the first cycle after the startup period as shown in FIG. 2, and peak detector 550 captures the peak value of the primary current, $I_{VS}*$, after timing and control block 580 deactivates the SAMPLE signal. Calculation block 560 further calculates the value of $V_{IN}{}^{CAL}$ by first determining $V_{IN}{}^{CAL}$ as described above, and then scaling $V_{IN}{}^{CAL}$ by $g_m$ and $R_S$. Timing and control block 580 opens and closes the switch formed by JFET 510 according to the flow chart of FIG. 4 in hardware, and detects whether $V_{CLAMP}$ is above the high threshold or below the low threshold as described above. As shown in FIG. 5, comparator 570 is a hysteretic comparator, but in other embodiments it could be implemented with separate comparators having corresponding fixed thresholds.

Thus while specific embodiments have been provided, many additional embodiments will be apparent to persons of ordinary skill in the art reading this disclosure. For example, while ACF controller 180 can be implemented as a single monolithic integrated circuit, in other embodiments different portions of ACF controller 180 can be implemented either monolithically or as discrete components. The high-side and low-side switches were shown as being N-channel MOSFETs, but in other embodiments other transistor types may be used. Likewise, switch 310 can be implemented with a JFET as shown in FIG. 5, or with other transistor types such as depletion mode MOSFETs. Moreover the protection mechanisms described herein may be changed or altered for different applications.

The above-disclosed subject matter is to be considered illustrative, and not restrictive, and the appended claims are intended to cover all such modifications, enhancements, and other embodiments that fall within the scope of the claims.

What is claimed is:

1. An active clamp flyback controller comprising:
   a first input terminal adapted to be coupled to a terminal of a clamp capacitor;
   a second input terminal for receiving a sense voltage proportional to a voltage across an auxiliary winding of a flyback transformer;
   a clamp voltage detection circuit coupled to said first and second input terminals, for detecting a clamp voltage as a difference between a voltage at said first input terminal and an input voltage, said clamp voltage detection circuit calculating said input voltage using said sense voltage without measuring said input voltage directly; and
   an overvoltage protection circuit coupled to said clamp voltage detection circuit for comparing said clamp voltage to a threshold and selectively triggering a protection operation if said clamp voltage is greater than said threshold.

2. The active clamp flyback controller of claim 1, wherein said clamp voltage detection circuit comprises:
   a first peak detector having an input selectively coupled to said first input terminal, a control input for receiving a startup control signal, and an output for providing a peak input voltage as a peak value at said first input terminal during an activation of said startup control signal;
   a second peak detector having an input coupled to said second input terminal, a control input for receiving a sample signal, and an output for providing a peak input current as a value of a peak voltage at said second input terminal during an activation of said sample signal; and
   a calculation block coupled to said first and second peak detectors and to said second input terminal, for calculating said input voltage by multiplying said peak input voltage by a ratio of a current at said second input terminal to said peak input current.

3. The active clamp flyback controller of claim 2, further comprising:
   a third terminal for conducting a power supply voltage to internal circuits of the active clamp flyback controller; and
   a startup bypass circuit having an input coupled to said first input terminal, a first output coupled to said third terminal and to internal circuitry of the active clamp flyback controller, and a second output for providing said startup control signal.

4. The active clamp flyback controller of claim 3, wherein said startup bypass circuit comprises:
   a switch having a first terminal coupled to said first input terminal, a second terminal coupled to said third terminal, and a control terminal; and
   a comparator having a first input coupled to said third terminal, a second input for receiving an undervoltage lockout threshold, and an output coupled to said control terminal of said switch.

5. The active clamp flyback controller of claim 1, wherein said clamp voltage detection circuit comprises:

a switch having a first current electrode coupled to said first input terminal, a control terminal, and a second current electrode for providing said clamp voltage;

a resistor having a first terminal coupled to said second current electrode of said switch, and a second terminal coupled to ground; and a transconductance amplifier having a first terminal for receiving said calculation of said input voltage, a second terminal coupled to a reference voltage terminal, and an output coupled to said first terminal of said resistor.

6. The active clamp flyback controller of claim 5, wherein said overvoltage protection circuit comprises:

a comparator having a first input for receiving said calculation of said clamp voltage, a second input for receiving a threshold voltage, and an output for providing an overvoltage protection signal; and a timing and control circuit having an input coupled to said output of said comparator, and an output coupled to said control terminal of said switch, wherein said timing and control circuit activates said switch to discharge a voltage on said first input terminal in response to an activation of said overvoltage protection signal.

7. The active clamp flyback controller of claim 6, wherein said timing and control circuit activates said switch for a predetermined period of time to discharge said voltage on said first input terminal.

8. The active clamp flyback controller of claim 6, wherein said timing and control circuit activates said switch until said clamp voltage falls below a low threshold.

9. The active clamp flyback controller of claim 1, wherein said protection operation comprises:

discharging a voltage on said first input terminal.

10. An active clamp flyback controller for use in a power supply system having a flyback transformer and a clamp capacitor coupled in series with a switch between first and second ends of a primary winding of the flyback transformer, wherein the first end of the primary winding receives an input voltage, comprising: a clamp voltage detection circuit coupled to the clamp capacitor, for determining a clamp voltage across the clamp capacitor as a difference between a voltage at a first terminal of the clamp capacitor and the input voltage, said clamp voltage detection circuit calculating the input voltage using a sense voltage proportional to a voltage across an auxiliary winding of the flyback transformer without measuring the input voltage directly; and an overvoltage protection circuit for comparing said clamp voltage to a first threshold and triggering a protection operation if said clamp voltage is greater than said first threshold, wherein: when said overvoltage protection circuit is in a green mode, said overvoltage protection circuit selectively discharges said clamp capacitor if said clamp voltage is greater than said first threshold, and said clamp voltage detection circuit stops monitoring said clamp voltage while said active clamp flyback controller remains in said green mode, and when said overvoltage protection circuit is in not in said green mode, said overvoltage protection circuit periodically measures said clamp voltage and triggers said protection operation if said clamp voltage is greater than said first threshold.

11. The active clamp flyback controller of claim 10, wherein in said green mode, said overvoltage protection circuit discharges said clamp capacitor until said clamp voltage is below a second threshold.

12. The active clamp flyback controller of claim 10, wherein when said overvoltage protection circuit is not in said green mode, said overvoltage protection circuit discharges said clamp voltage until either said clamp voltage is below a second threshold lower than said first threshold, or a predetermined amount of time has elapsed.

13. The active clamp flyback controller of claim 12, wherein after said predetermined amount of time has elapsed, said overvoltage protection circuit determines whether said clamp voltage is below said first threshold, and wherein:

if said clamp voltage is below said first threshold but not below said second threshold, then said overvoltage protection circuit continues to periodically monitor said clamp voltage; and if said clamp voltage is not below said first threshold, then said overvoltage protection circuit performs an overvoltage protection operation.

14. The active clamp flyback controller of claim 10, wherein said clamp voltage detection circuit determines said clamp voltage across said clamp capacitor by measuring a voltage on a first terminal of said clamp capacitor and calculating a voltage on a second terminal of said clamp capacitor without measuring said voltage on said second terminal of said clamp capacitor.

15. The active clamp flyback controller of claim 14, wherein said clamp voltage detection circuit calculates said voltage on said second terminal of said clamp capacitor using a signal from an auxiliary winding.

16. The active clamp flyback controller of claim 10, wherein said protection operation comprises:

discharging a voltage on said clamp capacitor.

17. A power supply system comprising: a flyback transformer having a primary winding, a secondary winding, and a bias winding, each winding having respective first and second ends; a primary side circuit having a low side switch coupled between said second end of said primary winding and a primary ground, a high side switch and a clamp capacitor coupled in series between said first and second ends of said primary winding; a bias winding circuit coupled to said bias winding for providing a sense voltage in response to a voltage between said first and second ends; and an active clamp flyback controller coupled to said low side switch and said high side switch to control a conduction state thereof, wherein said active clamp flyback controller comprises a first input terminal coupled to a node between said clamp capacitor and said high side switch, and a second input terminal for receiving the sense voltage, wherein said active clamp flyback controller determines a clamp voltage across said clamp capacitor using signals sensed from said first input terminal and said second input terminal without sensing a voltage on said first end of said primary winding.

18. The power supply system of claim 17, wherein said active clamp flyback controller further comprises:

a clamp voltage detection circuit coupled to said first and second input terminals, for detecting said clamp voltage as a difference between a voltage at said first input terminal and an input voltage, said clamp voltage detection circuit calculating said input voltage using signals from said first and second input terminals; and an overvoltage protection circuit coupled to said clamp voltage detection circuit for comparing said clamp voltage to a threshold and triggering a protection operation if said clamp voltage is greater than said threshold.

19. The power supply system of claim 18, wherein said protection operation comprises:

discharging a voltage on said first input terminal.

20. The power supply system of claim 19, wherein said clamp voltage detection circuit comprises:

a first peak detector having an input selectively coupled to first input terminal, a control input for receiving a startup control signal, and an output for providing a peak input voltage as a peak value at said first input terminal during an activation of said startup control signal;

a second peak detector having an input coupled to said second terminal, a control input for receiving a sample signal, and an output for providing a peak input current as a value of a peak voltage at said second input terminal during an activation of said sample signal; and a calculation block coupled to said first and second peak detectors and to said second input terminal, for calculating said input voltage by multiplying said peak input voltage by a ratio of a current at said second input terminal to said peak input current.

21. The power supply system of claim 20, further comprising:

a third terminal for conducting a power supply voltage to internal circuits of the active clamp flyback controller; and a startup bypass circuit having an input coupled to said first input terminal, a first output coupled to said third terminal and to internal circuitry of the active clamp flyback controller, and a second output for providing said startup control signal.

22. The power supply system of claim 21, wherein said startup bypass circuit comprises:

a switch having a first terminal coupled to said first input terminal, a second terminal coupled to said third terminal, and a control terminal; and a comparator having a first input coupled to said third terminal, a second input for receiving an undervoltage lockout threshold, and an output coupled to said control terminal of said switch.

23. The power supply system of claim 18, wherein said clamp voltage detection circuit comprises:

a switch having a first current electrode coupled to said first input terminal, a control terminal, and a second current electrode for providing said clamp voltage;

a resistor having a first terminal coupled to said second current electrode of said switch, and a second terminal coupled to ground; and a transconductance amplifier having a first terminal for receiving said input voltage, a second terminal coupled to a reference voltage terminal, and an output coupled to said first terminal of said resistor.

24. The power supply system of claim 23, wherein said overvoltage protection circuit comprises:

a comparator having a first input for receiving said clamp voltage, a second input for receiving a threshold voltage, and an output for providing an overvoltage protection signal; and a timing and control circuit having an input coupled to said output of said comparator, and an output coupled to said control terminal of said switch, wherein said timing and control circuit activates said switch to discharge a voltage on said first input terminal in response to an activation of said overvoltage protection signal.

25. The power supply system of claim 24, wherein said timing and control circuit activates said switch for a predetermined period of time to discharge said voltage on said first input terminal.

26. The power supply system of claim 24, wherein said timing and control circuit activates said switch until said clamp voltage falls below a low threshold.

27. A method of controlling an active clamp flyback power supply system having a flyback transformer with a primary winding, a secondary winding, and a bias winding each having first and second ends, and a primary side circuit having a low side switch coupled between said second end of said primary winding and a primary ground, and a high side switch and a clamp capacitor coupled in series between said first and second ends of said primary winding, comprising: determining a peak voltage of a first terminal of the clamp capacitor; determining a peak input current from said bias winding; determining an instantaneous input current from said bias winding; calculating an instantaneous input voltage of a bulk capacitor by multiplying said peak voltage by a ratio of said instantaneous input current from the bias winding to said peak input current; detecting a clamp voltage across the clamp capacitor by subtracting said instantaneous input voltage from a voltage on said first terminal of the clamp capacitor; and protecting a control circuit of the active clamp flyback power supply system in response to said clamp voltage exceeding a threshold.

28. The method of claim 27 further comprising:

determining whether the active clamp flyback power supply system is in a green mode; and isolating said first terminal of the clamp capacitor from the control circuit in response to the active clamp flyback power supply system being in said green mode.

29. The method of claim 28 further comprising:

determining whether said clamp voltage is above a first threshold; and discharging the clamp capacitor.

30. The method of claim 29 wherein said discharging comprises:

discharging the clamp capacitor until either said clamp voltage falls below a second threshold, or a predetermined time has elapsed.

31. The method of claim 30 further comprising:

activating an overvoltage protection operation if said predetermined time has elapsed and said clamp voltage remains above said first threshold.

32. The method of claim 30 further comprising:

determining whether the active clamp flyback power supply system has entered said green mode subsequent to said discharging the clamp capacitor; and if the active clamp flyback power supply system has entered said green mode subsequent to said discharging the clamp capacitor, discharging the clamp capacitor until either said clamp voltage falls below said second threshold or the active clamp flyback power supply system is no longer in said green mode.

\* \* \* \* \*